United States Patent [19]
Ha et al.

[11] Patent Number: 5,396,773
[45] Date of Patent: Mar. 14, 1995

[54] PROCESS FOR THE MIXED PRODUCTION OF HIGH AND LOW PURITY OXYGEN

[75] Inventors: Bao Ha, Vacaville, Calif.; Catherine Garnier, Paris, France

[73] Assignee: Liquid Air Engineering Corporation, Canada

[21] Appl. No.: 178,958

[22] Filed: Jan. 7, 1994

Related U.S. Application Data

[63] Continuation of Ser. No. 775,453, Oct. 15, 1991.

[51] Int. Cl.[6] .............................................. F25J 3/00
[52] U.S. Cl. ........................................... 62/39; 62/41; 62/31
[58] Field of Search ................... 62/22, 23, 24, 31, 32, 62/37, 38, 39, 41

[56] References Cited

U.S. PATENT DOCUMENTS

| 4,615,716 | 10/1986 | Cormier et al. | 62/22 X |
| 4,702,757 | 10/1987 | Kleinberg | 62/24 |
| 4,704,148 | 11/1987 | Kleinberg | 62/32 X |
| 4,777,803 | 10/1988 | Erickson | 62/22 |
| 4,817,393 | 4/1989 | Erickson | 62/38 X |
| 4,817,394 | 4/1989 | Erickson | 62/22 |
| 4,854,954 | 8/1989 | Erickson | 62/22 |
| 4,895,583 | 1/1990 | Flanagan et al. | 62/24 |
| 4,936,099 | 6/1990 | Woodward et al. | 62/24 |
| 5,006,137 | 4/1991 | Agrawal et al. | 62/38 X |
| 5,006,139 | 4/1991 | Agrawal et al. | 62/38 X |
| 5,069,699 | 12/1991 | Agrawal | 62/31 |
| 5,114,449 | 5/1992 | Agrawal et al. | 62/22 |
| 5,165,245 | 11/1992 | Agrawal et al. | 62/38 |
| 5,255,524 | 10/1993 | Agrawal et al. | 62/22 |
| 5,257,504 | 11/1993 | Agrawal et al. | 62/24 |

Primary Examiner—Christopher Kilner
Attorney, Agent, or Firm—Robert D. Touslee

[57] ABSTRACT

A process for simultaneously providing both high and low purity oxygen from a double column, double reboiler apparatus, the double columns being high and low pressure columns, the low pressure column having a lower and upper reboiler with an intermediate outlet in between, which process entails extracting a low purity oxygen stream at the intermediate outlet and a high purity liquid oxygen stream from a bottom portion of the low pressure column.

10 Claims, 5 Drawing Sheets

PROCESS FOR THE MIXED PRODUCTION OF HIGH AND LOW PURITY OXYGEN

This is a continuation of application Ser. No. 07/775,453, filed Oct. 15, 1991.

BACKGROUND OF THE INVENTION

1. Field of the Invention

The present invention relates to a process for the mixed production of high or low purity oxygen using a double reboiler and double column arrangement.

2. Description of the Background

The double reboiler and double column process was developed to produce relatively low purity oxygen at purities below 97% oxygen content. This process is described in U.S. Pat. No. 3,113,854 and in the Electric Power Research Institute (ERPI) Study 3499. Additionally, U.S. Pat. No. 4,895,583 discloses a modification of an earlier process in order to improve the overall recovery of oxygen.

Another example of a conventional double column and double reboiler process for producing relatively low purity oxygen is that disclosed in U.S. Pat. No. 4,705,548. However, this process is disadvantageous as it requires the use of a compressor for nitrogen recycling.

Attempts to produce high oxygen purities, such as above 97% oxygen content, using the double reboiler and double column methodology have not been considered interesting due to the sharp reduction in process efficiency and loss of recovery which is entailed. These drawbacks occur because it is necessary to perform the very difficult argon/oxygen separation by cryogenic distillation for oxygen contents of higher than 97%.

At present, in order to obtain an oxygen content of greater than 97%, the single reboiler, double column process is usually used. Unfortunately, this process has a much higher specific power consumption than the double reboiler and double column process.

It would be extremely advantageous if a process were known for producing oxygen at both low and high purity. Frequently, an on-site oxygen facility may produce a gaseous oxygen product at 95% purity for a pipeline customer, yet local demand may require a liquid oxygen product having 99.6% oxygen content which is a normal standard grade for liquid oxygen.

Furthermore, in situations where significant liquid production is required a traditional single reboiler process is used whereby air, expanded through an expander, is injected into the high pressure column. This affords a good recovery of oxygen since the majority of the air is still being treated in the high pressure column and does not by-pass the first step of distillation.

However, this feature has a major drawback because of the relatively high discharge pressure of the expander which is the high pressure column pressure. The feed air pressure must, therefore, be maintained at a high pressure to achieve the required refrigeration. In such situations, high power consumption would be needed to produce the required liquid.

Thus, a need exists for a process for producing oxygen at both low and high purity, more precisely, low purity gaseous oxygen and high purity liquid oxygen, and which is not characterized by a prohibitively high specific power consumption.

SUMMARY OF THE INVENTION

Accordingly, it is an object of the present invention to provide a process for producing oxygen at both low and high purity.

It is also an object of the present invention to provide a process for producing oxygen at both low and high purity, which is not characterized by having a prohibitively high specific power consumption.

Moreover, it is a specific object of the present invention to produce simultaneously both high and low purity oxygen using a double reboiler, double column process and optionally with feed stream expansion into the high pressure fractionating means.

The above objects and others which will become apparent in view of the following disclosure, are provided by a process of simultaneously producing both high and low purity oxygen, which entails:

a) passing a compressed and cooled feed stream containing at least oxygen and nitrogen to a main exchanger, wherein the compressed and cooled feed stream is divided into two fractions (A) and (B), b) expanding the first fraction (A) in an expander and dividing the same into two further fractions (i) and (ii), c) further cooling the second fraction (B) in the main exchanger and expanding at least a fraction of this stream by an expansion valve into a high pressure column as liquid feed stream, d) introducing the first fraction (i) into a reboiler located at the bottom of the low pressure distillation column, whereby the first fraction of the feed stream condenses in the reboiler providing a first reboil for distillation, e) feeding at least a fraction of the resulting liquefied feed stream to both high and low pressure columns as feed, f) introducing the second fraction (ii) to the bottom of the high pressure column as gaseous feed, whereby a bottom oxygen-rich liquid stream and an overhead nitrogen-rich gaseous stream are formed, g) passing the oxygen-rich liquid stream to the low pressure column as feed, h) condensing the nitrogen-rich gaseous stream against a boiling liquid in the upper reboiler of the low pressure column, located at an intermediate stage, thereby serving as a second reboil for distillation, i) returning a portion of the condensed nitrogen-rich stream to the high pressure column as reflux, and passing at least a fraction of the remaining portion of the nitrogen-rich stream to the top of the low pressure column as reflux, whereby the low pressure column separates its feed into bottom stream oxygen products and top stream rich in nitrogen, j) recovering the bottom stream oxygen product as high purity liquid oxygen, k) drawing from a tray or a stage between the two reboilers of the low pressure column, the stream oxygen product, as low purity oxygen, and l) warming in the main exchange the low purity oxygen stream, and the nitrogen-rich stream.

DETAILED DESCRIPTION OF THE PREFERRED EMBODIMENT

In accordance with the present invention, both high and low purity oxygen are simultaneously produced using a double reboiler, double column process with feed stream expansion having reduced power consumption.

In more detail, it has been discovered that by adding an intermediate outlet between the two reboilers of the upper distillation column, a low purity oxygen stream can be extracted at this outlet simultaneously with another high purity liquid oxygen stream produced at the bottom of the distillation column. By using the present invention, significant amounts of high purity liquid oxygen can be produced simultaneously with the low purity oxygen product with excellent recovery/efficiency.

The double reboiler, double column process is characterized by condensing a feed stream against oxygen product. This results in a relatively low operating pressure of about 4 bar for the high pressure column. A conventional single reboiler process would require a pressure of about 6 bar. Therefore, significant power savings are achievable with the double reboiler, double column process if an oxygen purity of less than 97% is acceptable.

However, poor oxygen recovery would result if higher purity oxygen is required using the double reboiler, double column process.

That is, the double reboiler, double column process is characterized by a low operating pressure, low purity oxygen and low power consumption. In contrast, the traditional simple reboiler process is characterized by a high operating pressure, high purity oxygen and high power consumption.

In order to produce a significant amount of liquid oxygen, the feed stream expansion process is frequently used where the feed stream is expanded through an expander into the high pressure column. For the production of a given amount of liquid, feed stream pressure upstream of the expander would be much lower for the double reboiler process since its discharge pressure is the lower of the two processes. Therefore, much lower power consumption can be achieved for the liquid production.

In accordance with the present invention, it has been surprisingly discovered that the double reboiler process can produce a high proportion of high purity oxygen product while maintaining high overall oxygen recovery. For example, up to 30% of 99.9% purity liquid oxygen can be produced in conjunction with 95% purity gaseous oxygen and with a recovery of between 99.5% and 97.5%, which is, indeed, unexpected. This result is unexpected because 30% is a high proportion for a cryogenic air separation process.

Of course, the process of feed stream expansion into a high pressure fractionating means is suitable for relatively significant liquid production at 40% or below of the total production. For higher percentages, one must rely upon an independent refrigeration cycle. For small quantities of liquid production, any expansion means is suitable, such as nitrogen-rich gas expansion or air expansion into a low pressure fractionating means.

As used herein, the term "feed stream" refers to any gaseous mixture containing at least nitrogen and oxygen. For example, the feed stream may be atmospheric air or may be an off-gas mixture.

As used herein, the term "recovery" is defined as total contained oxygen in products divided by total oxygen contained in the feed stream. The term "percent high purity oxygen" is defined as production of high purity oxygen divided by total oxygen production.

Furthermore, as used herein, the term "high purity oxygen" means any gas containing at least 97 mol % of oxygen, whereas the term "low purity oxygen" means any gas containing less than 97 mol % of oxygen.

The present invention provides an intermediate outlet between the two reboilers of the upper distillation column to extract a low purity oxygen stream. Additionally, a high purity liquid oxygen stream is recovered at the bottom.

In particular, the present method involves various steps which will now be described in general by reference to FIG. 2.

First, a feed stream, such as purified atmospheric air, is compressed and cooled. Thereafter, the feed stream is fed through conduit (101) to a main exchanger (11), where the feed stream is further cooled and then divided into two fractions (A) and (B). First fraction (A) is then expanded in expander (12), and thereafter further divided into two fractions (i) and (ii) at the junction of conduits (106) and (107).

Feed stream (B) is further cooled in the main exchanger and at least a fraction of this stream is expanded by expansion valve (130a) into a high pressure column (20) as liquid feed stream.

First fraction (i) is introduced into a reboiler (24) at the bottom of the low pressure distillation column (21) to provide a first reboil for distillation. Thereafter, at least a fraction of the resulting liquefied feed stream is fed to either or both high and low pressure columns as feeding conduits (111) and/or (112).

Then, the second fraction (ii) is fed to the bottom of the high pressure column (20) as gaseous feed, to form a bottom oxygen-rich liquid stream (108) and an overhead nitrogen rich gaseous stream (114). Thereafter, the oxygen-rich liquid stream is passed to the low pressure column (21) as feed.

The nitrogen-rich gaseous stream is condensed against a boiling liquid in the upper reboiler (23) of the low pressure column (21), thereby serving as a second reboil for distillation. Then, a portion of the condensed nitrogen-rich stream is returned in conduit (131) to the high pressure column (20) as reflux via conduit (115) and the remaining portion of the nitrogen-rich stream to the top of the low pressure column as reflux via conduit (116), whereby the low pressure column (21) separates its feeds into bottom stream oxygen products and top stream (120) rich in nitrogen.

Thereafter, bottom stream oxygen product (118) is recovered as high-purity oxygen. A stream (111) is then drawn at a stage between the two reboilers (23) and (24) of the low pressure column (21) as low purity gaseous oxygen product. Finally, the nitrogen-rich stream is warmed in at least exchanger (11), and optionally exchanger (22), via conduits (120) and (121), with the low purity oxygen stream (119) from the low pressure column.

Figure 2:
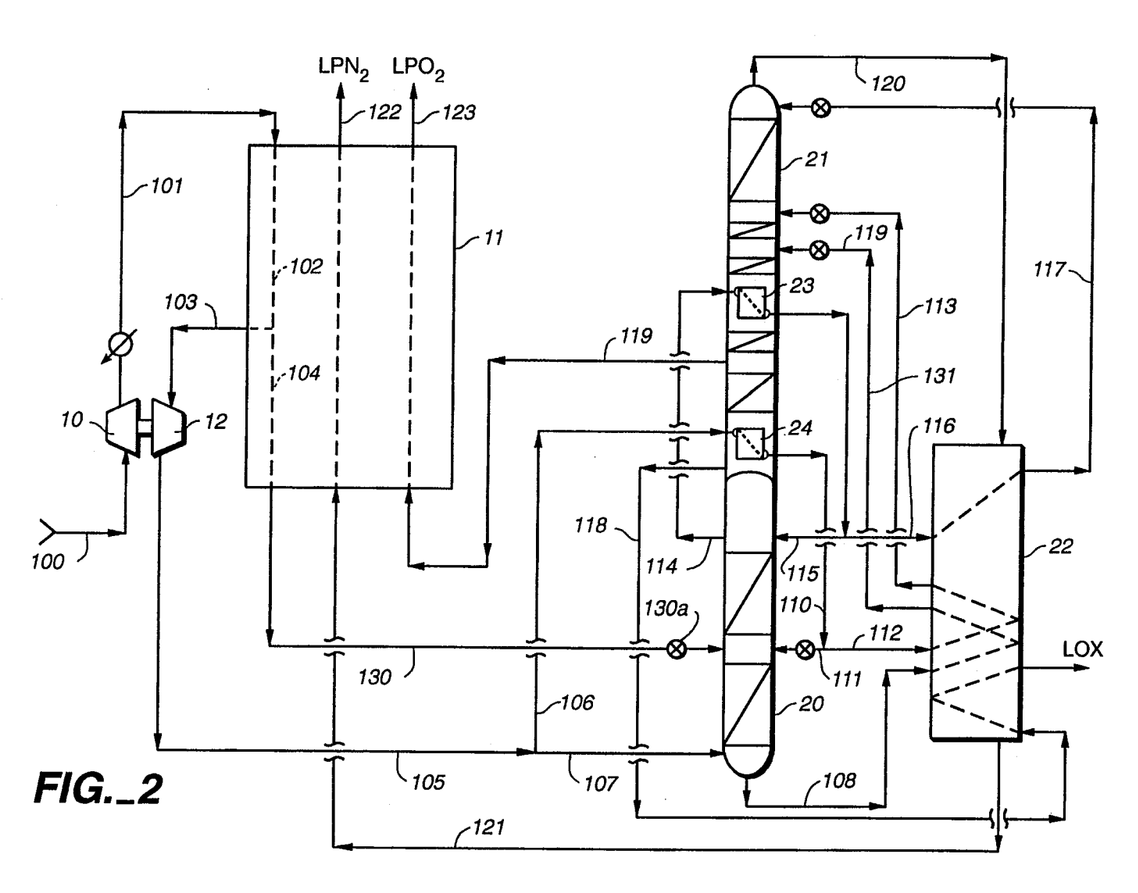
FIG. 2 illustrates an apparatus for practicing the present invention.

Additionally, in FIG. 2, a booster compressor (10), driven by the expander (12), may be optionally used to further compress the feed stream entering via conduit (100). The feed stream then is fed via conduit (101) to the main exchanger (11) and therethrough via conduit (102), whereinafter a portion of the feed stream is passed via conduit (103) to expander (12) and then to conduit (105), and thereinafter further divided into two fractions via conduits (106) and (107) as described above.

Further, in FIG. 2, oxygen-rich liquid stream (108) is optionally subcooled in exchanger (22) and then transferred to the low pressure column (21) via conduit (109). Moreover, the liquefied feed stream (112) may be subcooled in exchanger (22), and then transferred to the low pressure column via conduit (113). However, the liquefied feed stream may be fed directly to the low pressure column.

In more detail, a feed stream, containing at least nitrogen and oxygen, which has been compressed and cooled is passed to a main exchanger. The feed stream is compressed in compressing means and cooled. For example, the compressing means may comprise a booster (10) driven by a turbine (12). Generally, the feed stream after compression is at a pressure in the range of about 6 to 50 bar. The preferred pressure depends upon the percentage of liquid produced. If a higher percentage of liquid is needed then higher pressure is required. However, in general, the preferred pressure is in the range of about 10 to 35 bar. Then, the compressed, cooled and purified feed stream is further cooled in a main exchanger, where it is divided into two fractions (A) and (B). Generally, the feed stream is at a temperature in the range of about $-120°$ C. to $-150°$ C. It is preferred, however, that the feed stream be at a temperature of about $-125°$ C. to $-145°$ C. Thereafter, the first fraction (A) is expanded in step b) in an expander and subsequently divided into two further fractions (i) and (ii). Generally, the preferred discharge pressure range of the expander is 3 to 5 bar. Then, the second fraction (B) is further cooled in step c) in the main exchanger and at least a fraction of this stream is expanded by an expansion valve into the high pressure column as liquid feed stream.

In step c), fraction (B) is generally subcooled beyond the bubble point. It is preferred, however, that it be subcooled to a temperature in the range of about $-150°$ C. to $-180°$ C.

Then, in step d), the first fraction (i) is introduced into a reboiler located at the bottom of the low pressure distillation column, whereby the feed stream condenses in the reboiler providing a first reboil for distillation. At least a fraction of the resulting liquefied feed stream is then fed to either or both high and low pressure columns as feed. The temperature of the resulting liquefied feed stream to the high pressure column is generally near the bubble point, preferably at the bubble point. The temperature of the liquefied feed stream to the low pressure column is generally subcooled below the bubble point. The second fraction (ii) is introduced to the bottom of the high pressure column as gaseous feed, whereby a bottom oxygen-rich liquid stream and an overhead nitrogen-rich gaseous stream are formed. The temperature is near the dew point. The oxygen-rich liquid stream is then passed to the low pressure column as feed.

Generally, in passing the oxygen-rich liquid stream to the low pressure column as feed, the stream is preferably subcooled before expanding into the low pressure column.

The nitrogen-rich gaseous stream is then condensed against a boiling liquid in the upper reboiler of the low pressure column, thereby serving as a second reboil for distillation. A portion of the condensed nitrogen-rich stream is returned to the high pressure column as reflux, and the remaining portion of the nitrogen-rich stream is passed to the top of the low pressure column as reflux, whereby the low pressure column separates its feeds into bottom oxygen products and top stream rich in nitrogen.

Then, the bottom oxygen product (118) is recovered as high purity liquid oxygen. Generally, for the bottom stream oxygen products purities in the range of 97% to 99.99% are obtained. Thereafter, a stream (119) is drawn at a tray located between the two reboilers of the low pressure column as low purity oxygen. In this step, the vapor product can be extracted as part of the vapor leaving the tray or stage in the case that structured packings are used or, an equivalent means which is conventionally so used. If the product is liquid, the liquid product is extracted as part of the liquid leaving the tray or stage. Finally, in the main exchanger, the low purity oxygen stream and the nitrogen-rich stream are warmed to ambient conditions.

However, in addition to the exemplary process scheme described above, various modifications may also be made. For example, argon may be recovered by means of an argon sidearm column at a tray between the two oxygen product outlets or a stage in the case of structured packings.

As used herein, the term "tray" refers to any means or device for effecting intimate contact and mass transfer between a descending liquid phase and an ascending vapor phase. These various trays are well known to those skilled in the art.

The term "tray" as used herein also includes means known as structured packings or equivalent means which are devices equivalent to trays to effect such intimate contact for oryogenic air separation. Examples of structured packings are disclosed, e.g. in U.S. Pat. Nos. 2,047,444; 4,186,156 and 4,296,050, each patent being incorporated herein by reference in the entirety, and Ellis et al, *Trans. Instn. Chem. Engrs.*, 41, 1963, known as Goodloe packings. These structured packings are known as means to promote liquid and/or vapor mixing in a direction perpendicular to the primary flow direction, i.e., the vertical direction. Furthermore, a combination of trays and packings can be used as mass transfer means.

Reference will now be made to each of FIGS. 1–4 in detail.

Figure 1:
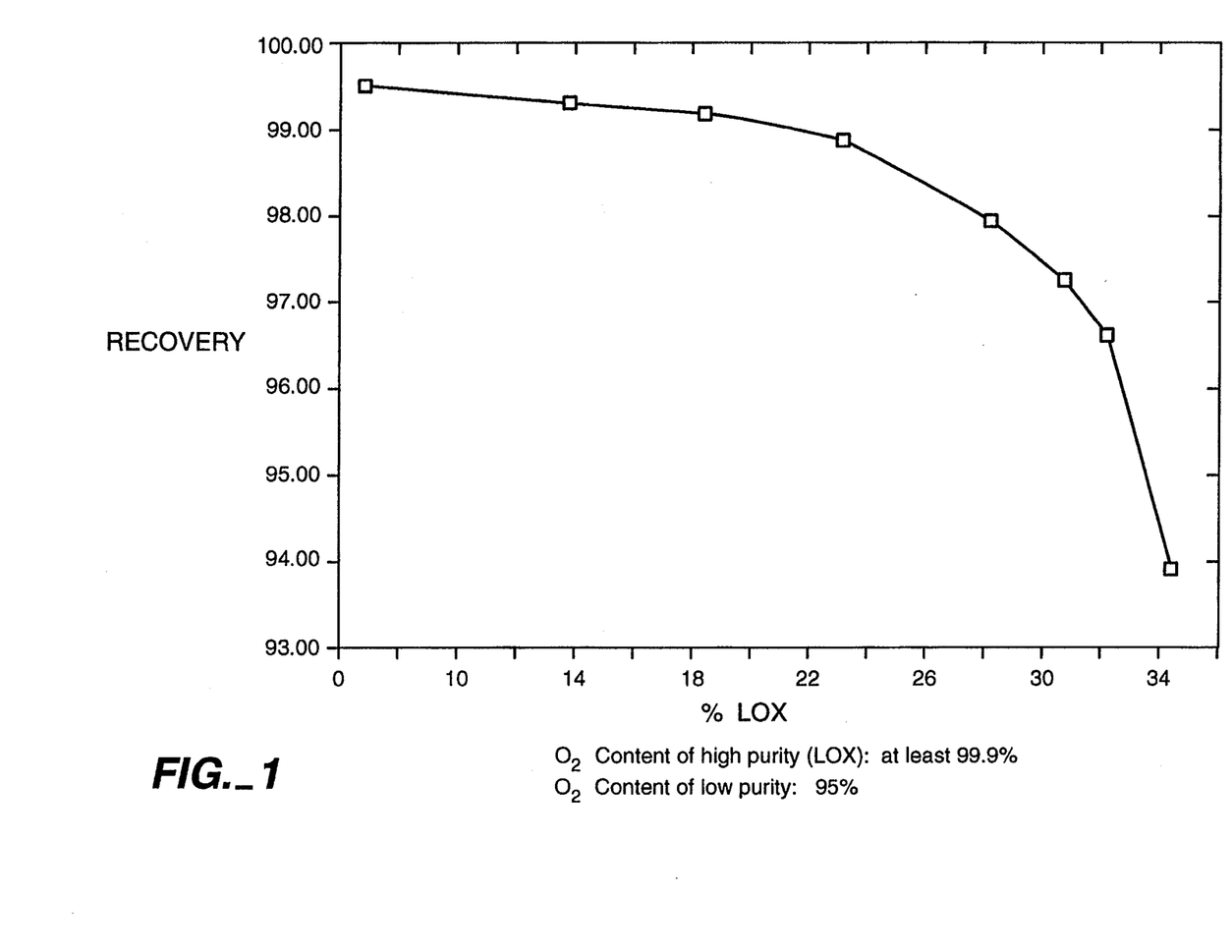
FIG. 1 illustrates the relationship between overall oxygen recovery and percentage of high purity liquid produced for 95% low purity gaseous oxygen and 99.9% high purity liquid oxygen.

FIG. 1 illustrates the relationship between overall oxygen recovery and percentage of high purity liquid produced for 95% low purity gaseous oxygen and 99.9% high purity liquid oxygen.

As may be seen from FIG. 1, recovery remains rather constant up to about 30% high-purity liquid oxygen production, and drops sharply beyond this point. Generally, in accordance with the present invention, recoveries of high purity liquid oxygen of equal to or less than 35% are obtained.

FIG. 2 illustrates an embodiment of the present invention as described above.

Figure 3:
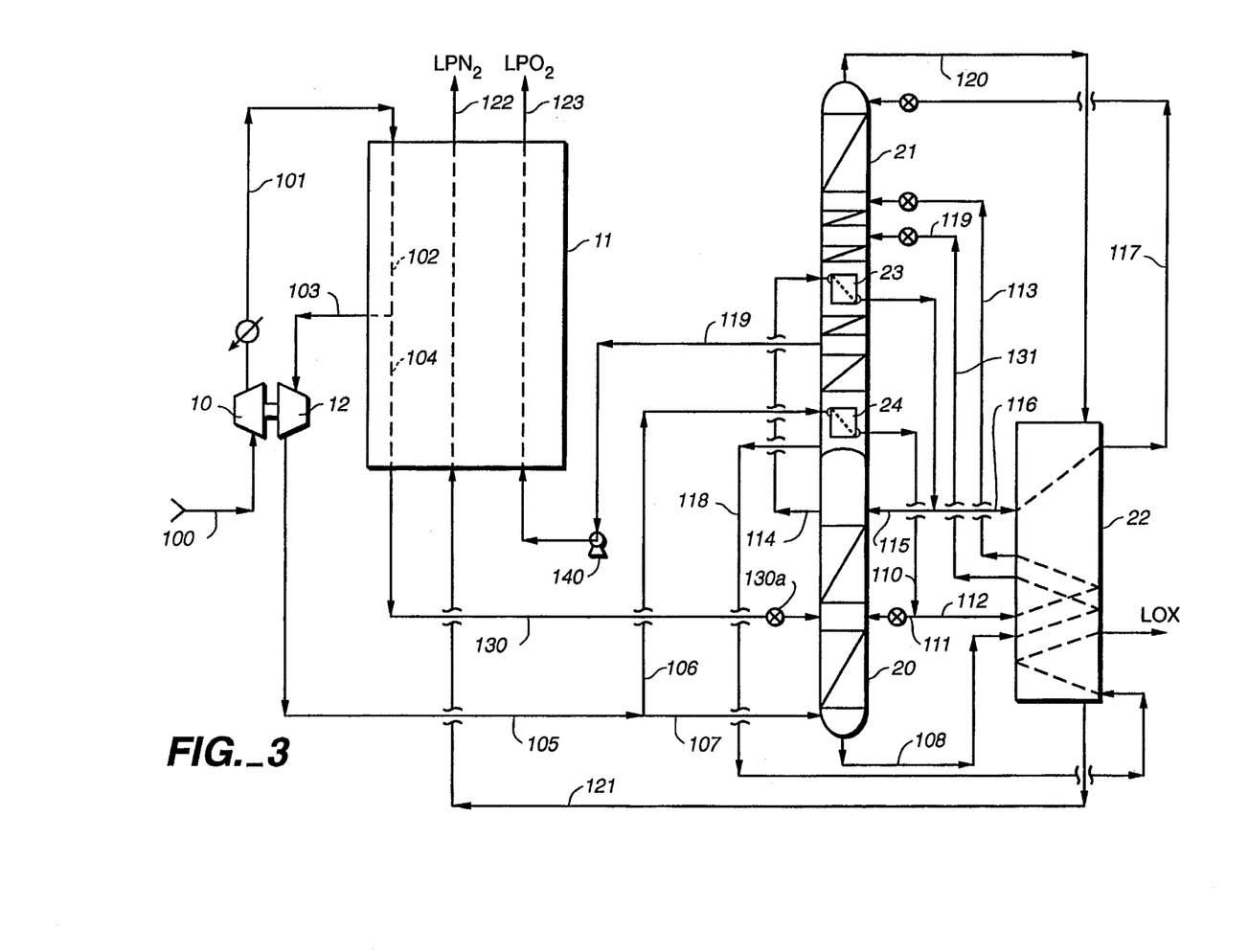
FIG. 3 illustrates an alternative apparatus for practicing the present invention using a pumping process where pumped liquid oxygen is vaporized directly in the main exchanger.

FIG. 3 illustrates another embodiment of the present invention using a pumping process where pumped liquid oxygen is vaporized directly in the main exchanger.

In FIG. 3, the low purity oxygen stream (119) is produced in the liquid form directly off the low pressure column (21). This liquid is then pumped to a higher pressure using a pumping means (140) and then vaporized and warmed in the main exchanger (11). At the same time, a high pressure feed stream (104) is condensed in the main exchanger (11) to provide necessary heat for the vaporization of the oxygen stream.

The remaining elements depicted in FIG. 3 correspond to those already depicted and described for FIG. 2.

Figure 4:
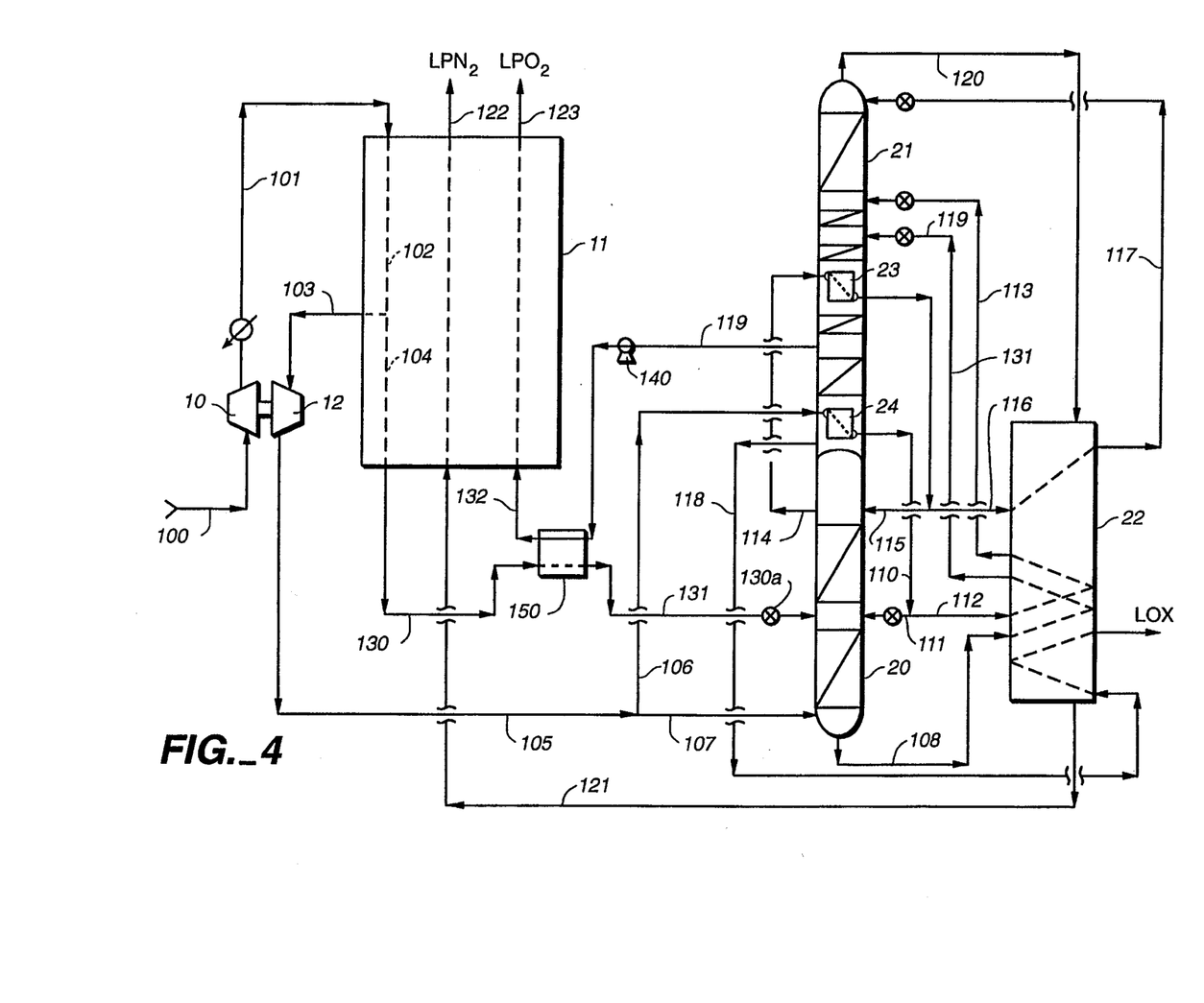
FIG. 4 illustrates an apparatus for practicing the present invention using a pumping process where pumped liquid oxygen is vaporized in a separate exchanger against a condensing feed stream.
Figure 5:
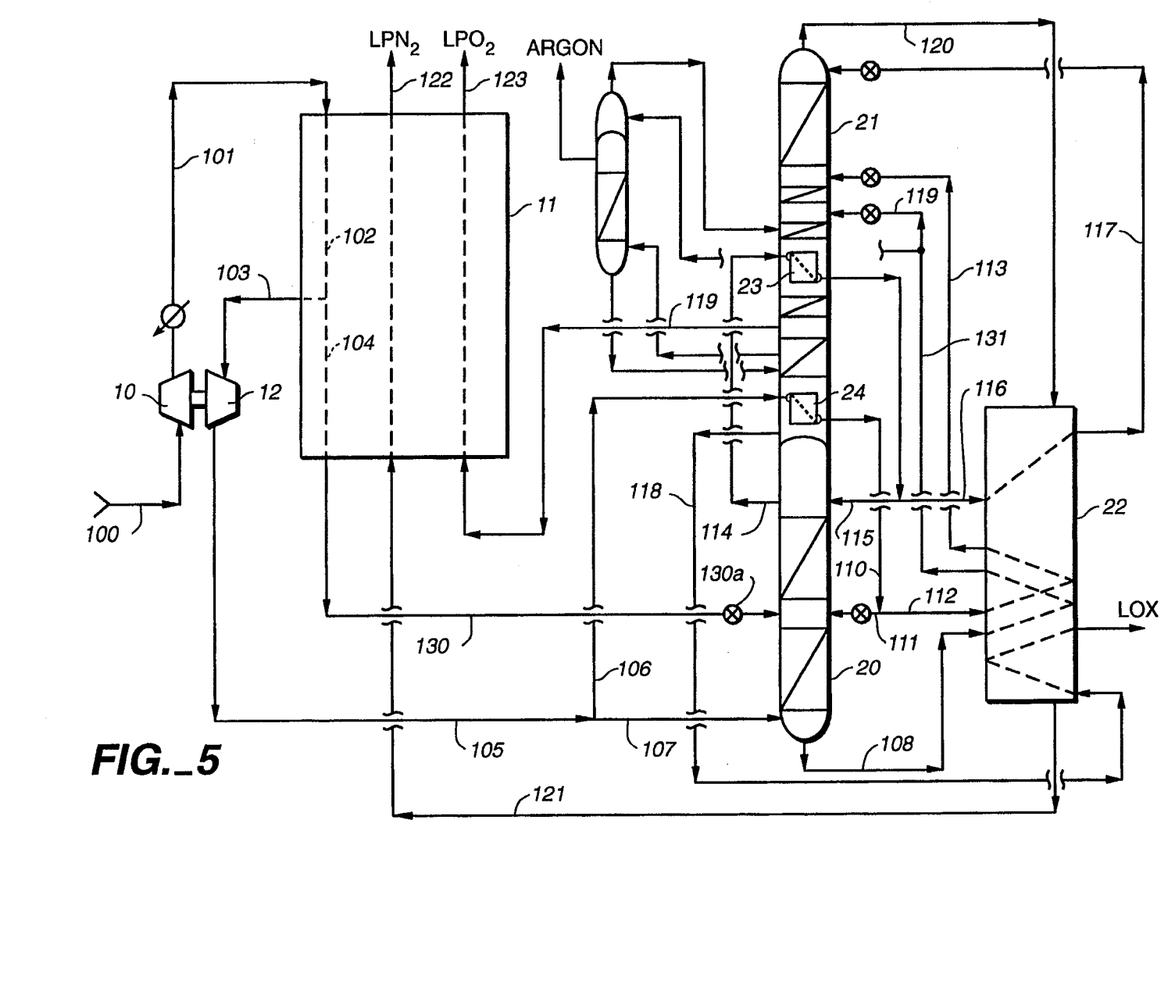
FIG. 5 illustrates an apparatus for practicing certain embodiments of the present invention and recovering argon using the argon sidearm column at a tray or stage between two oxygen product outlets.

In FIG. 4, the low purity oxygen stream (119) is produced in the liquid form directly off the low pressure column (21). This liquid is then pumped to a higher pressure using pumping means (140) and then vaporized in a separate exchanger (150) against a condensing feed stream.

The remaining elements depicted in FIG. 4 correspond to those already depicted and described for FIG. 2.

In accordance with another aspect of the present invention, a process is provided for simultaneously producing both high and low purity oxygen, which entails:

a) condensing a first compressed, cooled and purified feed stream fraction in a reboiler located at the bottom of a low pressure column;

b) feeding at least a fraction of the resulting liquefied feed stream to either or both high and low pressure columns as feed;

c) introducing a second fraction of feed stream to the bottom of the high pressure column as gaseous feed, whereby a bottom oxygen-rich liquid stream and an overhead nitrogen-rich gaseous stream are formed;

d) passing the oxygen-rich liquid stream to the low pressure column as feed;

e) condensing the nitrogen-rich gaseous stream against a boiling liquid in the upper reboiler of the low pressure column, thereby serving as a second reboil for distillation;

f) returning a portion of the condensed nitrogen-rich stream to the high pressure column as reflux, and passing at least a fraction of the remaining portion of the nitrogen-rich stream to the top of the low pressure column as reflux, whereby the low pressure column separates its feeds into bottom stream oxygen products and top stream rich in nitrogen;

g) recovering the bottom stream oxygen product as high purity liquid oxygen; and h) drawing from a tray or a stage between the two reboilers of the low pressure column, the stream oxygen product as low purity oxygen.

In the above process, the temperatures and pressures recited for the previous process are also applicable therein.

As used herein, the term "feed stream" refers to any mixture of gas containing nitrogen and oxygen, such as air or any off-stream gas mixture containing oxygen, nitrogen and other gases. In the present invention, however, it has been found advantageous to use atmospheric air, which has been cleaned and dried, as a feed stream. Further, the present process is of particular advantage when used with any feed stream mixture containing nitrogen, oxygen and argon.

The present invention also provides various apparati for practicing the processes of the present invention.

Generally, the present invention provides an apparatus for simultaneously producing both high and low purity oxygen, which entails a double rectification column having a lower pressure fractionating means with two reboilers therein, and a higher pressure fractionating means, wherein an intermediate outlet is provided between the two reboilers of the lower pressure fractionating means for simultaneously extracting a low-purity oxygen stream and a high-purity liquid oxygen stream.

In more detail, the apparatus entails a double rectification column having high and low pressure fractionating means with two reboilers in the low pressure fractionating means, and having a first feed stream input means in fluid connection with a first reboiler located at the bottom of the low pressure fractionating means, a second feed stream input means in fluid connection with the bottom of the high pressure fractionating means, and a third feed stream input means in fluid connection with the high pressure column; expanding means in contact with the second and third feed stream input means and being upstream of the double rectification column; conduit means for feeding liquefied feed stream to both high and low pressure fractionating means from the lower reboiler of the low pressure fractionating means; conduit means for feeding part of a nitrogen-rich stream from the upper reboiler of the low pressure fractionating means to the high pressure fractionating means, and conduit means for feeding a remaining part of the nitrogen-rich stream to the top of the low pressure fractionating means; conduit means for feeding an oxygen-rich liquid stream to the low pressure fractionating means; and output means for recovering high-purity oxygen. Such an apparatus is depicted in FIG. 2, and has already been described in detail above.

Alternatively, an apparatus is provided wherein the low purity oxygen stream is produced in liquid form directly off the low pressure column. This liquid is then pumped to a higher pressure using pumping means and then vaporized and warmed in the main exchanger. At the same time, a high pressure feed stream is condensed in the main exchanger to provide necessary heat for the vaporization of the oxygen stream. Such an apparatus is depicted in FIG. 3.

Additionally, an apparatus is provided wherein the low purity oxygen stream is produced in the liquid form directly off the low pressure column. This liquid is then pumped to a higher pressure using pumping means and then vaporized in a separate exchanger against a condensing feed stream. Such as apparatus is depicted in FIG. 4.

Having described the present invention, it will be apparent to one of ordinary skill in the art that many changes and modifications can be made to the above-described embodiments without departing from the spirit and the scope of the present invention.

What is claimed as new and desired to be secured by letters patent of the United States is:

1. An apparatus for simultaneously producing both high and low purity oxygen, which comprises a double rectification column having therein a lower pressure fractionating means with two reboilers therein, and a higher pressure fractionating means, wherein an intermediate outlet is provided between the two reboilers of the lower pressure fractionating means at least one theoretical stage above the lower of the two reboilers for extracting a low purity oxygen stream therefrom and an outlet for withdrawing a high purity liquid oxygen stream from a bottom portion of said column; and which apparatus further comprises conduit means to flow at least a portion of the low-purity oxygen stream to heat exchanging means to produce a low purity oxygen product stream.

2. The apparatus of claim 1, which further comprises a first feed stream input means in fluid connection with a first reboiler located at the bottom of the low pressure fractionating means, a second feed stream input means in fluid connection with the bottom of the high pressure fractionating means and a third feed stream input means in fluid connection with the high pressure fractionating means.

3. The apparatus of claim 1, which further comprises expanding means in contact or connection with all of said feed stream input means upstream of said double rectification column.

4. The apparatus of claim 2, which further comprises conduit means for feeding at least a fraction of liquefied feed stream from the bottom of the low pressure fractionating means to either or both of high or low pressure columns as feed.

5. The apparatus of claim 2, which further comprises conduit means for feeding a portion of a condensed nitrogen-rich stream from the upper reboiler of the low pressure fractionating means to the high pressure fractionating means as reflux.

6. The apparatus of claim 5, which further comprises conduit means for feeding the remaining portion of the nitrogen-rich stream to top of the low pressure column as reflux.

7. The apparatus of claim 2, which further comprises output means for recovering high-purity oxygen product.

8. The apparatus of claim 2, which further comprises an ultimate feed stream input means feeding said first, second and third feed stream input means and being upstream thereof, said ultimate feed stream input means in fluid connection with a booster compressor driven by an expander.

9. The apparatus of claim 1, which further comprises pumping means within said conduit means between said intermediate outlet and said heat exchanging means.

10. The apparatus of claim 9, wherein said heat exchanging means comprises a main exchanger and a separate heat exchanger for warming at least a portion of said low purity oxygen stream against condensing feed air, prior to further warming said low purity oxygen stream in said main exchanger.

* * * * *